(12) United States Patent  
Vanotti et al.

(10) Patent No.: US 7,674,379 B2  
(45) Date of Patent: Mar. 9, 2010

(54) WASTEWATER TREATMENT SYSTEM WITH SIMULTANEOUS SEPARATION OF PHOSPHORUS AND MANURE SOLIDS

(75) Inventors: Matias B. Vanotti, Florence, SC (US); Ariel A. Szogi, Florence, SC (US); Lewis M. Fetterman, Clinton, NC (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 11/820,396

(22) Filed: Jun. 19, 2007

(65) Prior Publication Data

US 2008/0314837 A1    Dec. 25, 2008

(51) Int. Cl.
*C02F 3/30* (2006.01)
*C02F 11/02* (2006.01)

(52) U.S. Cl. .................... 210/605; 210/623; 210/631; 210/903; 210/906; 210/173; 210/195.3; 210/259

(58) Field of Classification Search .............. 210/605, 210/621–623, 631, 903, 906, 173, 195.1, 210/195.3, 252, 259
See application file for complete search history.

(56) References Cited

U.S. PATENT DOCUMENTS

| | | | | |
|---|---|---|---|---|
| 3,462,275 | A * | 8/1969 | Bellamy | 426/53 |
| 4,772,307 | A * | 9/1988 | Kiss et al. | 71/13 |
| 6,592,762 | B2 * | 7/2003 | Smith | 210/605 |
| 6,893,567 | B1 * | 5/2005 | Vanotti et al. | 210/605 |
| 2002/0074295 | A1 * | 6/2002 | Cohen et al. | 210/723 |
| 2002/0104798 | A1 * | 8/2002 | Takechi et al. | 210/605 |
| 2003/0141245 | A1 * | 7/2003 | Fetterman et al. | 210/609 |

* cited by examiner

*Primary Examiner*—Fred Prince
(74) *Attorney, Agent, or Firm*—John D. Fado; Gail E. Poulos (57) ABSTRACT

Wastewater treatment systems and processes for removal of solids, pathogens, nitrogen, and phosphorus from municipal and agricultural wastewater include the simultaneous separation of solids and phosphorus from wastewater and industrial effluents.

6 Claims, 3 Drawing Sheets

FIG 1A

PRIOR ART

WASTEWATER TREATMENT SYSTEM WITH SIMULTANEOUS SEPARATION OF PHOSPHORUS AND MANURE SOLIDS

BACKGROUND OF THE INVENTION

1. Field of the Invention

This invention relates to a wastewater treatment system that uses simultaneous separation of solids and phosphorus sludge from agricultural and municipal wastewater and industrial effluents and to methods for the simultaneous removal of manure solids and phosphorus from municipal and agricultural wastewater.

2. Description of the Related Art

Municipal and agricultural waste disposal is a major problem. For agricultural animals, the animals are confined in high densities and lack functional and sustainable treatment systems. The liquid wastes are generally treated in large anaerobic lagoons with intermittent disposal through land applications (Stith, P. and Warrick, J., Boss Hog: North Carolina's pork revolution, The News & Observer, 1-3, Feb. 19-26, 1995; USEPA, Proposed regulations to address water pollution from concentrated animal feeding operations, EPA 833-F-00-016, January 2001, Office of Water, Washington, D.C. 20460). This system was developed in the early and mid $20^{th}$ century prior to the current trend in high concentrated livestock operations. One of the main problems in sustainability is the imbalance of nitrogen (N) and phosphorus (P) applied to land (USEPA, supra; Cochran et al., Dollars and Sense: An economic analysis of alternative hog waste management technologies, Environmental Defense, Washington, D.C., 2000). Nutrients in manure are not present in the same proportion needed by crops, and when manure is applied based on a crop's nitrogen requirement, excessive phosphorus is applied resulting in phosphorus accumulation in soil, phosphorus runoff, and eutrophication of surface waters (Heathwaite et al., A conceptual approach for integrating phosphorus and nitrogen management at watershed scales, J. Environ. Qual., Volume 29, 158-166, 2000; Sharpley et al., Practical and innovative measures for the control of agricultural phosphorus losses to water: An overview, J. Environ. Qual., Volume 29, 1-9, 2000; Edwards and Daniel, Environmental Impacts of On-Farm Poultry Waste Disposal—A Review, Bioresource Technology, Volume 41, 9-33, 1992).

The change from small individual animal production operations to large, confined, commercial enterprises has caused many problems for the animal production industry including emission of ammonia ($NH_3$) from lagoons. It may be anticipated that about 50-80% of the nitrogen (N) entering animal lagoons will escape to the atmosphere through $NH_3$ volatilization (Miner and Hazen, Transportation and application of organic wastes to land, In: Soils for Management of Organic Wastes and Waste Waters, 379-425, eds: L. F. Elliot and F. J. Stevenson, Madison, Wis.: ASA/CSSA/SSSA; Barrington and Moreno, Swine Manure Nitrogen Conservation Using Sphagnum Moss, J. Environ. Quality, Volume 24, 603-607, 1995; Braum et al., Nitrogen Losses from a Liquid Dairy Manure Management System, I: Agron. Abstracts, Madison, Wis., ASA, 1997). Biological removal of nitrogen through the process of nitrification and denitrification is regarded as the most efficient and economically feasible method available for removal of nitrogen from wastewaters (Tchobanoglous, G. and F. L. Burton, Wastewater Engineering Treatment, Disposal, and Reuse, Boston, Mass.: Irwin/McGraw-Hill, 1991). The effectiveness of the biological nitrogen removal process depends on the ability of nitrifying organisms to oxidize ammonium ions ($NH_4^+$) to nitrite ($NO_2^-$) and nitrate ($NO_3^-$). Subsequent reduction of molecular nitrogen, denitrification may be essential as well if one desires to reduce total nitrogen as well as ammonia nitrogen. This step is rapid with available carbonaceous substrate and an anaerobic environment, conditions which are typically found in farm settings in constructed wetlands or liquid manure storage units. The reaction rate of nitrification is extremely low compared to that of denitrification, so that nitrification normally will be a rate limiting step in the biological nitrogen removal process (Vanotti and Hunt, Transactions of the ASAE, Volume 43 (2), 405-413, 2000). Nitrification of wastewater can be performed with many processes such as for example suspended-growth nitrification, attached-growth nitrification, etc. Two bacterial genera are responsible for nitrification. Nitrosomonas oxidizes ammonia to the intermediate product nitrite and nitrite is converted to nitrate by Nitrobacter. The term nitrifiers is a general term that applies to a consortia of Nitrosomonas and Nitrobacter well known in the art. Nitrifying bacteria are present in almost all aerobic biological treatment processes, but their numbers are limited. There are many aerobic processes that have been developed to favor nitrification (Tchobanoglous G. and F. L. Burton; supra). They can be separated into two main groups: suspended-growth and attached-growth (Grady, C. P. L., G. T. Daigger, and H. C. Lim. 1999. Biological Wastewater Treatment. $2^{nd}$ ed. Marcel Dekker, New York, N.Y.). In suspended-growth nitrification, a nitrifying sludge composed of free bacteria is mixed with the wastewater liquid by the aeration or agitation of the liquid. The commonly used activated-sludge process is a suspended growth process that combines bacterial biological oxygen demand (BOD) removal and bacterial nitrification treatment (nitrogen removal) that are performed by separate bacteria. In other cases, carbon oxidation and nitrification functions are done in separate tanks. Attached-growth nitrification uses various media so that the nitrifying bacteria attach to the surface of the media, examples include trickling filters, rotating biological contactors, packed-bed reactors, overland flow, and others known in the art. Another type of attached-growth system is intermediate between suspended- and attached-growth and that is a fluidized bed biological reactor. In this type of reactor nitrifying pellets remain suspended in the fluid, i.e., fluidized by the drag forces associated with the upward flow of air and water. The nitrifying bacteria are attached to various light-weight media or entrapped in polymeric porous materials made of polyvinyl alcohol (PVA) or polyethylene glycol (PEG) and fluidized in the reactor tank. One of the advantages of using such nitrifying pellets is that the number of microorganisms in the reactor can be increased thus removing the ammonia more quickly. Whether a fluidized bed biological reactor, a six hour process, or suspended growth process, a two day process, is used, the changes in water characteristics after treatment are the same. All nitrifiers are autotrophic microorganisms that consume ammonia, oxygen, and carbon dioxide, and produce oxidized nitrogen (nitrate and nitrite) and acidity. Thus, the nitrification process removes both carbonate alkalinity and ammonia from wastewater and increase acidity (Vanotti et al, Trans. ASAE, Volume 46 (6), 1665-1674, 2003). In general, any nitrification process will work provided bacteria is adapted to operate at high ammonia concentrations. U.S. Pat. No. 6,893,567 to Vanotti et al., issued May 17, 2005, teaches that once ammonia and carbonate alkalinity concentrations in swine wastewater are substantially reduced with a nitrification pre-treatment, the subsequent addition of lime rapidly increases the pH of the liquid, thereby removing the soluble phosphates contained in the wastewater and promoting formation of phosphorus precipitate with small amounts of chemical added.

The basic problem related to nitrification in wastewaters with a high content of organic carbon is the low growth rate of the nitrifying bacteria; the generation time of these microorganisms is about 15 hours. Compared to heterotrophic microorganisms, which have generation times of 20-40 minutes, the nitrifiers compete poorly for limited oxygen and nutrients and tend to be overgrown or washed out of reactors (Figueroa and Silverstein, Water Environ. Res., Volume 64 (5), 728-733, 1992; Wijffels et al., Possibilities of vitrification with immobilized cells in wastewater treatment Model or practical systems, Wat. Sci. Tech., Volume 27 (5-6), 233-240, 1993). The nitrification of lagoon swine wastewater is an especially difficult process because of the very low numbers of Nitrosomonas and Nitrobacter usually found after anaerobic treatment (Blouin et al., Nitrification of swine waste, Canadian J. Microbiol., Volume 36, 273-278, 1990). Even when the oxygen supply is plentiful, an adaptation period is needed to reach a minimum bacteria concentration for effective nitrification. Recycling surplus activated sludge in an aerobic reactor or long hydraulic retention time (HRT) is required to retain slow growing autotrophic nitrifiers. Unfortunately, in the absence of enriched nitrifying populations, aerobic treatment of lagoons can potentially add to problems by stripping ammonia into the atmosphere, particularly if uncontrolled or excessive flow rates of air are used (Burton, A review of the strategies in the aerobic treatment of pig slurry: Purpose, theory, and method, J. Agric. Eng. Res., Volume 53, 249-272, 1992).

Managing agricultural sources of phosphorus and nitrogen at the watershed scale in order to reduce their impact on water quality requires a balanced and holistic approach (Heathwaite et al., J. Environ. Qual., Volume 29, 158-166, 2000). In the past, most emphasis has been placed on nitrogen management to ameliorate nitrate losses to ground water. While the high solubility and mobility of nitrate within agricultural systems may justify this emphasis, such bias ignores other critical elements, notably phosphorus.

Phosphorus inputs accelerate eutrophication when it runs off into fresh water and has been identified as a major cause of impaired water quality (Sharpley et al., 2000, supra). Eutrophication restricts water use for fisheries, recreation, industry, and drinking due to the increased growth of undesirable algae and aquatic weeds and resulting oxygen shortages caused by their death and decomposition. Also many drinking water supplies throughout the world experience periodic massive surface blooms of cyanobacteria. These blooms contribute to a wide range of water-related problems including summer fish kills, unpalatability of drinking water, and formation of trihalomethane during water chlorination. Consumption of cyanobacteria blooms or water-soluble neuro- and hepatoxins released when these blooms die can kill livestock and may pose a serious health hazard to humans. Recent outbreaks of the dinoflagellate *Pfiesteria piscicida* in near-shore waters of the eastern United States also may be influenced by nutrient enrichment. Although the direct cause of these outbreaks is unclear, the scientific consensus is that excessive nutrient loading helps create an environment rich in microbial prey and organic matter that *Pfiesteria* and menhaden (target fish) use as a food supply. In the long-term, decreases in nutrient loading will reduce eutrophication and will likely lower the risk of toxic outbreaks of *Pfiesteria*-like dinoflagellates and other harmful algal blooms. These outbreaks and awareness of eutrophication have increased the need for solutions to phosphorus run-off.

Past research efforts on phosphorus removal from wastewater using chemical precipitation have been frustrating due to the large chemical demand and limited value of by-products such as alum sludge, or because of the large chemical demand and huge losses of, ammonia at the high pH that is required to precipitate phosphorus with calcium (Ca) and magnesium (Mg) salts (Westerman and Bicudo, Tangential flow separation and chemical enhancement to recover swine manure solids and phosphorus, ASAE Paper No. 98-4114, St. Joseph, Mich.: ASAE, 1998); Loehr et al., Development and demonstration of nutrient removal from animal wastes, Environmental Protection Technology Series, Report EPA-R2-73-095, Washington, D.C.: EPA, 1973). Other methods used for phosphorus removal include flocculation and sedimentation of solids using polymer addition, ozonation, mixing, aeration, and filtration (See U.S. Pat. No. 6,193,889 to Teran et al). U.S. Pat. No. 6,153,094 to Craig et al. teaches the addition of calcium carbonate in the form of crushed limestone to form calcium phosphate mineral. The patent also teaches adsorbing phosphorus onto iron oxyhydroxides under acidic conditions.

Continuing efforts are being made to improve agricultural, animal, and municipal waste treatment methods and apparatus. U.S. Pat. No. 5,472,472 and U.S. Pat. No. 5,078,882 (Northrup) disclose a process for the transformation of animal waste wherein solids are precipitated in a solids reactor, the treated slurry is aerobically and anaerobically treated to form an active biomass. The aqueous slurry containing bioconverted phosphorus is passed into a polishing ecoreactor zone wherein at least a portion of the slurry is converted to a beneficial humus material. In operation the system requires numerous chemical feeds and a series of wetland cells comprising microorganisms, animals, and plants. See also U.S. Pat. Nos. 4,348,285 and 4,432,869 (Groeneweg et al); U.S. Pat. No. 5,627,069 to Powlen; U.S. Pat. No. 5,135,659 to Wartanessian; and U.S. Pat. No. 5,200,082 to Olsen et al (relating to pesticide residues); U.S. Pat. No. 5,470,476 to Taboga; and U.S. Pat. No. 5,545,560 to Chang.

U.S. Pat. No. 6,177,077 (Lee et al.) and U.S. Pat. No. 6,200,469 (Wallace) both relate to the removal of nitrogen and phosphorus from wastewater wherein the phosphate is removed using microorganism in aerobic tanks which absorb the phosphorus released from denitrified wastewater. See also U.S. Pat. No. 6,113,788 to Molof et al., U.S. Pat. No. 6,117, 323 to Haggerty; U.S. Pat. No. 6,139,743 to Park et al.

There is concern about the introduction and spread of diseases through wastewater. For example, there is great concern about the spread of Foot and Mouth Disease in countries throughout the world. Major programs are in place at present in countries free of Foot and Mouth Disease to prevent the introduction or spread of the disease. The Irish Agriculture and Food Development Authority (Teagasc) implemented a 12-point Foot and Mouth Disease protection plan including restrictions in liquid manure spreading on fields allowing only emergency spreading when manure storage tanks are likely to overflow. If the disease is introduced, it could be spread as an aerosol during liquid manure spreading. The virus can persist in aerosol form for long periods. It is estimated that sufficient virus to initiate infection can be windborne as far as 100 km (Blood, D. C., Radostits, O. M., and Henderson, J. A., Veterinary Medicine, 6.sup.th addition, pages 733-737, 1983. Bailliere Tindall, London, U.K.). The virus is resistant to common disinfectants and the usual storage practices. But it is particularly susceptible to changes in pH away from neutral, or to heat treatment using autoclaving under pressure. Liquid swine manure normally has a pH of about 6 to 8, and the Foot and Mouth Disease virus can survive in this pH range. A shift in the pH in either direction below 5 and above 9 makes conditions for survival less favorable. Thus, infectivity of the Foot and Mouth Disease virus may be effectively destroyed by chemicals such as acids and alkalis (Callis, J., and Gregg, D., Foot-and-mouth disease in cattle, pages 437-439, 1986. In J. L. Howard (ed.), Current Veterinary Therapy 3. W. B. Saunders Company. Philadelphia, Pa.). Unfortunately, liquid swine manure contains inherent buffers, mainly carbonates and ammonia, that prevent changes in pH except when large amounts of chemicals are used. In addition to the large chemical need, addition of acid to liquid manure gives a sudden release of hydrogen sulfide and risk of gas poisoning. On the other hand, increase of pH 9 with the addition of alkali chemicals such as calcium hydroxide (lime) or sodium hydroxide is prevented by ammonia equilibrium. This means that the alkali is used to convert ammonia into gas form before effective increase of pH above 9 is achieved. Ammonia volatilization from animal facilities is an environmental problem in and of itself.

U.S. Pat. No. 6,893,567, issued May 7, 2005 (Vanotti et al), is directed to wastewater systems and processes for the removal of solids, pathogens, nitrogen, and phosphorus from municipal and agricultural wastewater which includes nitrification of wastewater and increasing the pH of the nitrified wastewater by adding a metallic-containing salt and hydroxide to precipitate phosphorus to form a useable effluent having a specified nitrogen:phosphorus ratio that is useful as a fertilizer or spray for remediation of contaminated soils. The system also reduces the presence of infectious microorganisms such as enterobacteriogenic bacteria and picarnoviruses. The precipitated phosphorus is recovered and used to form useable phosphorus products.

The polymer PAM is extensively used as a settling agent for food processing and packing, paper production, mine and municipal wastewater treatment, as a clarifier for sugar extraction and potable water treatment, and as a soil conditioner to reduce irrigation water erosion (Barvenick, Soil Science, Volume 158, 235-243, 1994). It has also been shown that cationic PAM are also used to substantially increase separation of suspended solids, organic nutrients, and carbon compounds from liquid animal manures (Vanotti and Hunt, Trans. ASAE, Volume 42 (6), 1833-1840, 1999; Chastain et al., Appl. Engr. Agric., Volume 17 (3), 343-354, 2001; Vanotti et al., Trans. ASAE, Volume 45 (6), 1959-1969, 2002; Walter and Kelley, Biores. Technol., Volume 90, 151-158, 2003; Timby et al., Appl. Engr. Agric., Volume 20 (1), 57-64 2004; Estevez Rodriguez et al., Appl. Engr. Agric., Volume 21 (4), 739-742, 2005; Vanotti et al., Proc. WEFTEC '05, 4073-4092, 2005(c)).

While various systems have been developed for treating wastewater for the removal of solids, pathogens, nitrogen, and phosphorus; there still remains a need in the art for a more effective wastewater treatment system. The present invention, different from prior art systems, provides a system which generates one solids stream instead of two that facilitates management and operation. It eliminates a dewatering step, and reduces the use of polymers. In the present invention, two or more sludges with contrasting chemical properties can be combined using a single application of polymer flocculants and one common dewatering equipment, which together simplifies the overall capital investment and operational costs for dewatering, an important step in wastewater treatment.

SUMMARY OF THE INVENTION

It is therefore an object of the present invention to provide a system for treating wastewater wherein said system simultaneously separates solids from two sources and produces one stream of solids.

A further object of the present invention is to provide a system for treating wastewater wherein at least one polymer flocculant is used to simultaneously separate solids from two streams having different chemical and physical properties.

A still further object of the present invention is to provide a system for treating wastewater wherein said polymer is a polyacrylamide.

A still further object of the present invention is to provide a system for treating wastewater wherein said polyacrylamide is a cationic polyacrylamide.

Another object of the present invention is to provide a method for treating wastewater wherein two wastewater sludges of different chemical and physical characteristics are mixed, treating the mixture with a polymer to separate solids in said mixture to form a single solid containing stream and an effluent stream, and further treating said effluent to remove nitrogen by a nitrification and denitrification process followed by phosphorus precipitating step to form a phosphorus sludge and a treated effluent.

A further object of the present invention is to provide a method for treating wastewater wherein the two wastewater sludges are swine manure and phosphorus sludge.

A still further object of the present invention is to provide a method for treating wastewater wherein the polymer is a polyacrylamide.

A still further object of the present invention is to provide a method for treating wastewater wherein the polyacrylamide is a cationic polyacrylamide.

Further objects and advantages of the invention will become apparent from the following description.

BRIEF DESCRIPTION OF THE DRAWINGS

FIGS. 1(*a*) and (*b*) are drawings of a schematic of a swine manure treatment system without a lagoon. FIG. 1(*a*) is a prior art system as disclosed in U.S. Pat. No. 6,893,567, issued May 17, 2005. FIG. 1(*b*) is a drawing of the system of the present invention showing separation and dewatering of phosphorous sludge using a solids separation unit.

FIG. 2 is a drawing of a schematic showing a configuration of the process of the present invention used to simultaneously separate solids from phosphorus sludge and liquid swine manure which is a raw waste.

FIG. 3 is a graph showing removal of total phosphorus (TP) and total suspended solids (TSS) from mixtures of liquid swine manure and precipitated phosphorus sludge (PS) using PAM flocculation and screening. Each point is the average of six tests. Complete analyses of the treated effluent are shown in Table 7.

FIG. 4 is a graph of polymer use efficiency obtained with increased amount of phosphorus sludge added to liquid swine manure. Polymer use efficiencies were calculated with respect to total phosphorus and total suspended solids removals using data in FIG. 3. Each point is the average of 6 tests.

FIG. 5 is a graph showing total phosphorus recovered in solids separated from liquid swine manure and phosphorus sludge (PS) using PAM flocculation and screening. Data show phosphorus recovery above the amount recovered in the control without phosphorus sludge addition (268.8±81.5 mg, Table 8). Each point is the average of 2 replicates.

DETAILED DESCRIPTION OF THE INVENTION

Figure 1A:
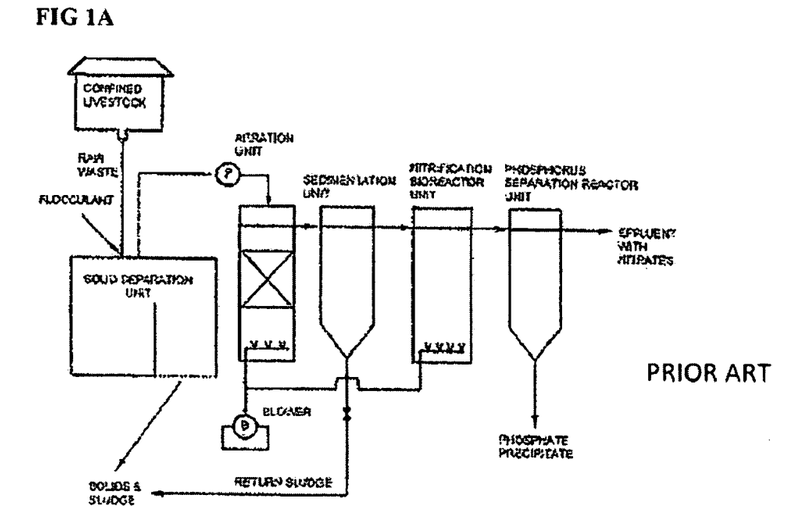
Figure 1B:
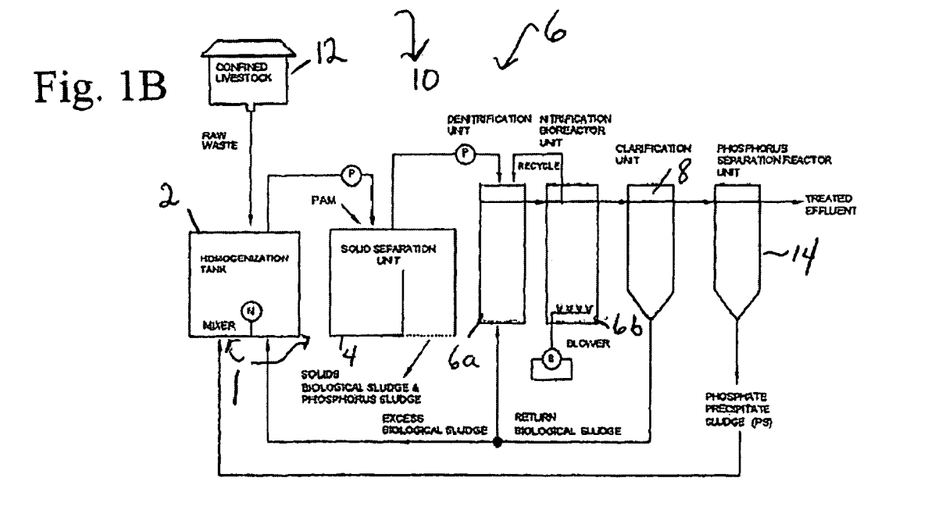

The present invention is a system for treating wastewater that does not include a lagoon and of simultaneously separating solids from two sources and producing only one stream of solids (FIG. 1b). System 10 of the present invention eliminates the discharge of waste to surface and ground waters, substantially reduces emission of ammonia and odors, eliminates the release of disease-transmitting vectors and air-borne pathogens, and reduces or eliminates nutrient and heavy metal contamination of soils and water. The present invention treats the entire waste stream using a three stage system with consecutive solids separation, nitrification/denitrification, and soluble phosphorus removal. System 10 cleans flushed manure liquid and separates two types of materials, manure solids and alkaline calcium phosphate solids. These materials are dewatered prior to leaving the treatment facility. A related art system disclosed in U.S. Pat. No. 6,893,567, issued May 17, 2005, (herein incorporated by reference) includes three basic processes in series with two solid separation streams: solid-liquid separation of raw swine manure (SM) using cationic polyacrylaminde (PAM), and subsequent treatment of liquid through nitrification-denitrification and a soluble phosphorus removal unit. The phosphorus removal unit used hydrated lime to precipitate phosphorus and anionic PAM to enhance dewatering of the phosphorus-rich sludge (PS).

The present invention is directed to a system that does not include a lagoon and flocculates and dewaters both phosphorus-rich sludge and raw swine manure in a simultaneous operation using the same dewatering equipment and producing only one stream of solids. Phosphorus-rich sludge has a higher pH than raw swine manure, pH 10.1 (PS) vs. 7.5 (SM); five time more total suspended solids (TSS), 29.5 g $L^{-1}$ (PS) vs. 5.7 g $L^{-1}$ (SM); and nine times more total phosphorus, 2.7 g $L^{-1}$ for PS vs. 0.3 g $L^{-1}$ for SM. When the phosphorus-rich sludge is added to the raw swine manure, the sludge remains a solid and all solids are efficiently separated using a single polymer application. Greater than 90% of the solids were separated. Useful polymers for the present invention include cationic PAM, cationic polyethylenimine (PEI), and natural polymer flocculants such as chitosan and polysaccharides. The simultaneous separation process does not increase the amount of polymer that would normally be used to effectively treat raw swine manure alone. The same dosage of polymer, approximately 60 mg $L^{-1}$ was effective even when the mixture contained about 43% more total suspended solids and about 94% more total phosphorus as a result of phosphorus-rich sludge addition up to about 150 mL $L^{-1}$. Polymer effectiveness in terms of total suspended solids or total phosphorus increased with the simultaneous separation process, from about 108 to about 160 TSS $g^{-1}$ polymer$^{-1}$, and from about 4.7 to about 11.4 total phosphorus $g^{-1}$ polymer$^{-1}$. The mass removal efficiencies at the higher phosphorus-rich sludge rate were about 96.8% for total suspended solids and about 94.7% for total phosphorus. Water quality of the treated liquid is also improved, and the phosphorus content of the separated solids is significantly increased, from about 9.5 to about 16.9% $P_2O_5$.

When polymers are used to enhance solid-liquid separation of sludges, (Vanotti and Hunt, Trans. ASAE, Volume 42 (6), 1833-1840, 1999; Szogi et al., Biores. Technol., Volume 97, 183-190, 2006), the common practice in industry is to match specific polymers to each type of sludge material (WERF, 1993), and then treat each sludge separately. Treatment of industrial and livestock effluents often generate more than one type of sludge in the same plant. Sludges having different chemical or physical characteristics are typically dewatered in specialized equipment such as polymer preparation pumps, mixing vessels, clarifiers, filters, presses, etc., for example, in order to produce dried solids amenable for transport and/or final disposal.

Polymers for use in the present invention, include, for example, polyacrylamide (PAMs). Polyacrylamindes are moderate to high molecular weight, long-chained, water-soluble polymers. The long polymer molecules destabilize suspended, charged particles by adsorbing onto them and building bridges between several suspended particles. With flocculation, the effective particle size is increased by agglomeration of small particles into a larger particle or floc that separate from the liquid and dewater more readily. PAMs have varied characteristics such as molecular weights and charge type: +, 0, −, density distribution of charge: 0% to 100%, chain structure, and, co-monomer that provide them with a variety of chemical performance characteristics and uses. Polymers useful in the present invention include PAMs including cationic PAMs, Examples of the different PAMs include, for example, PAM-C such as Magnifloc 494C which is a cationic PAM with about a 20 mole % charge density with about 85% active polymer, Magnifloc 496C which is a dry cationic PAM with about a 35 mole % charge density with about 85% active polymer, cationic PAM emulsion formulations Magnifloc 1594C and 1596C with 20 and 40% mole % charge, respectively, and 34% active polymer, cationic PAMs Magnifloc 1598C with about 55% charge and 41% active polymer (all from Cytec Industries Inc., West Paterson, N.J.); SNF Floerger FO4290, FO4350, FO4400, FO4440, FO4490, FO4550, FO4650 and FO4690 that are dry cationic polyacrylamide flocculants with about 20, 25, 30, 35, 40, 45, 55, and 60% mole % charge density, and emulsion equivalents (SNF, Floerger Chemtall, Riceboro, Ga.); etc.

System 10 (FIG. 1b) of the present invention includes a system that collects manure under barns 12 using slatted floors and a pit-recharge system (not shown). System 10 uses three process units: (1) the first process unit 2 separates solids from two chemically and physically different wastewater streams using polyacrylamide (PAM) polymer flocculant; (2) a second process unit 6 which biologically converts ammonia ($NH_4$—N) into $N_2$ gas through nitrification 6a and denitrification 6b; and (3) a third process unit 10 which precipitates phosphorus as a calcium phosphate solid (Vanotti et al, Trans. ASAE, Volume 46 (6), 1665-1674, 2003) and destroys pathogens by the high pH of the process (Vanotti et al., Biores. Technol., Volume 96, 209-214, 2005a).

Figure 2:
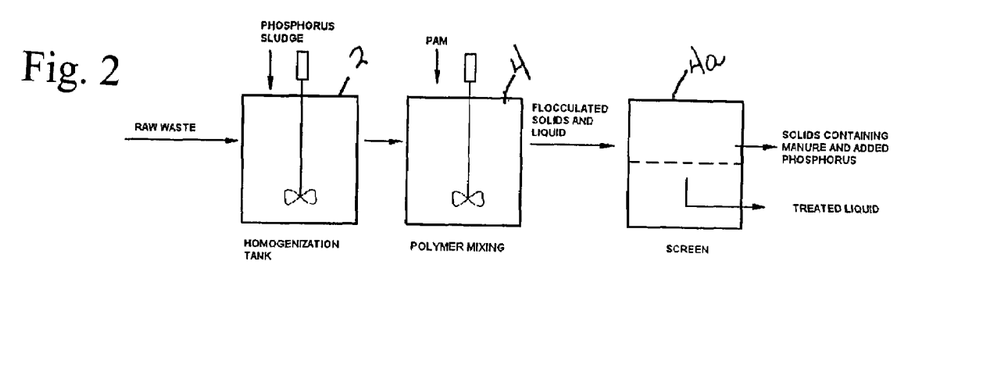

Process unit 1 includes a homogenization unit 2 and a polymer mixing/solid separation unit 4 that includes a screening means 4a that separates solids and liquids (See FIG. 2). Polymer mixing/solid separation 4 separates and dewaters phosphorus sludge and raw liquid manure in a simultaneous operation, producing only one stream of solids (See FIG. 1b). The raw flushed manure from barns 12 of livestock is mixed in a homogenization tank. The solid-liquid separation unit uses, for example, an Ecopurin separation module (Selco MC, Castellon, Spain). It includes injection of cationic PAM, reaction in a mixing chamber 4 and separation of flocculated manure solids with a screening means 4a, that includes, for example, a wedge-wire rotating screen having an opening size of about 250 micrometers made of stainless-steel. A small belt filter press (Monobelt, Tecknofanghi S.R.L., Italy) (not shown) further dewaters the screened solids. The solid-liquid separation module 1 removes approximately 93% of the total suspended solids contained in the raw manure (Vanotti et al., 2005c, supra). Depending on size of the flocs, which varies with manure characteristics and polymer type and dosage used, and type of separation module, screen sizes can be selected from a range of about 200 to 1000 micrometers so that it provides the best TSS separation and a clear effluent without clogging the screen. In tests of polyacrylamide polymers applied to liquid-solid separation of swine manure using various stationary screens, Vanotti et al., Trans. ASAE, Volume 45 (6), 1959-1969, 2002, produced flocs that were large enough to be effectively retained by a 1-mm opening screen (95% TSS separation efficiency). The effectiveness of a 0.8-mm size was similar. But the use of a larger screen (1.6-mm) greatly decreased TSS separation performance (67% efficiency).

Other solid separation unit devices known in the art can be used after polymer mixing and flocculation, such as rotary presses, vacuum filtration, gravity settling, centrifuges, etc. Rotary press technology uses for example a moving chamber or head (rotary press) after polymer mixing and flocculation. The head contains lateral screens that separates the flocs from the liquid, and internal pressure is used to remove moisture from the flocs as they exit the head, producing a very dry cake. Examples of rotary press separation units are the Fournier rotary press (Fournier Industries Inc., Thetford Mines, Quebec, Canada), and Prime Solution rotary fan press (Prime Solution, Inc., Allegan, Mich.).

In the present invention, the amount of oxidized nitrogen (nitrate plus nitrite) contained in the treated effluent (System 10, FIG. 1) can be adjusted by varying the internal rate of liquid recycle between the nitrification bioreactor unit 6a and denitrification unit 6b. For example, low internal recycle rates of less then 3:1 (i.e. 3 volumes are internally recycled between nitrification tank and denitrification tank for every volume in-flow to the process unit 6, FIG. 1) will produce effluents with very low ammonia but high oxidized N content. For example, about 25%, 33%, 50% and >90% of the influent ammonia remains as oxidized N operating the system with internal recycle rations of 3:1, 2:1, 1:1, and 0:1, respectively). On the other hand, higher recycles rates in the range of 3.5:1 to 10:1 are desirable for effluents containing low ammonia and low oxidized N concentrations. Higher amount of oxidized nitrate in the effluent is desirable for remediation and cleanup of old swine lagoons that are replaced with the invented system. This is because the nitrate effectively consumes the sludge accumulated in the lagoons; therefore, when the system effluent is discharged into the old lagoon, it significantly reduces the amount of sludge that need to be disposed of, which represents a significant economic advantage to the farmer.

Referring to FIG. 2, phosphorus sludge containing calcium phosphate is first mixed with swine manure (SM) in a homogenization vessel 2 and the mixture is transferred into a polymer mixing vessel 4 where it is reacted with PAM for flocculation. The flocculated solids containing manure and added phosphorus are separated by passing the liquid through a screening means 4a.

Wastewater and phosphorus sludge analyses included total suspended solids (TTS), chemical oxygen demand (COD), Kjeldahl N (TKN) total phosphorus (TP), soluble P (o-$PO_4$), ammonia-N($NH_4$—N), pH, and alkalinity. All the analyses were done according to *Standard Methods for the Examination of Water and Wastewater* (APHA, 1998). Total suspended solids (TSS) were determined by retaining solids on a 1.5 micrometer glass-fiber filter (Whatman grade 934-AH, Whatman Inc., Clifton, N.J.) dried to about 105 degrees C. (Standard Method 2440 D). Chemical oxygen demand (COD) was measured with the closed reflux, calorimetric method (Standard Method 5220 D). The soluble P was determined by the automated ascorbic acid method (Standard Method 4500-P F) after filtration through a 0.45 micron membrane filter (Gelman type Supor-450, Pall Corp, Ann Arbor, Mich.). The same filtrate was used to measure $NH_4$—N by the automated phenate method (Standard Method 4500-$NH_3$ G). Total Phosphorus and Total Kjeldahl Nitrogen were determined using the ascorbic acid method and the phenate method, respectively, adapted to digested extracts (Technicon Instruments Corp., 1977). Alkalinity was determined by acid titration to the bromocresol green endpoint (pH=4.5) and expressed as mg $CaCO_3$/liter.

The following examples are intended only to further illustrate the invention and are not intended to limit the scope of the invention which is defined by the claims. Swine wastewater is used as a model system for the present invention.

EXAMPLE 1

Flushed raw swine manure (SM) and phosphorus sludge (PS) used in all of the examples were collected from a homogenization tank and the phosphorus separation unit, respectively, from a system as described in U.S. Pat. No. 6,893,567, supra and shown in FIG. 1a with the plant operating at steady state. Swine manure samples were collected immediately after flushing about 136 $m^3$ of manure from three barns into the homogenization tank. An existing submergible mixer (3.5 kW, 12.1 $m^3$/min, ABS Pumps, Inc., Meriden, Conn.) kept the manure well mixed during the sampling. The swine manure samples were taken from mid-height of the homogenization tank using plastic tubing connected to a peristaltic pump sampler (Sigma 900, American Sigma, Inc., Medina, N.Y.), and collected in 20-liter plastic containers. The phosphorus sludge samples were taken from the bottom of the settling tank of the phosphate removal unit (FIG. 1a) using existing manual valves, and also collected in 20-liter plastic containers. The containers were transported in large coolers filled with ice to the Laboratory and kept at approximately 4° C. until used in the following examples. Characteristics of the swine manure and phosphorus sludge are summarized in Table 1.

TABLE 1

Characteristics of flushed swine manure and precipitated phosphorus sludge.

| | Flushed Swine Manure (1) | Precipitated Phosphorus Sludge (2) | Ratio (2)/(1) |
|---|---|---|---|
| Total Suspended Solids (g/L) | 5.72 (1.59)[a] | 29.51 (0.14) | 5.16 |
| Chemical Oxygen Demand g/L | 8.41 (1.69) | 6.89 (1.07) | 0.82 |
| Total Phosphorus mg/L | 302 (55) | 2741 (92) | 9.08 |
| Soluble Phosphorus mg/L | 71.6 (8.0) | 0.2 (0.2) | 0.03 |
| Total Kjeldahl Nitrogen (mg/L) | 942 (176) | 251 (52) | 0.27 |
| Ammonia-N (mg/L) | 557 (76) | 87 (29) | 0.16 |
| pH | 7.5 (0.1) | 10.1 (0.1) | 1.35 |

[a]Data are the mean and standard deviation of nine samples

EXAMPLE 2

To evaluate the possible re-dissolution of phosphorus sludge when mixed with raw swine manure, PAM addition and screening were not performed. Phosphorus sludge was mixed with raw swine manure at a rate of approximately 33 ml/L and the mixture was continuously stirred at about 60 rpm during a 24 hour period using a 6-unit programmable jar tester (model PB-900, Phipps & Bird, Inc., Richmond, Va.) The rate of approximately 33 ml of phosphorus sludge per liter of swine manure is based on average flows of approximately 39 $m^3/d$ for swine manure into the homogenization tank and approximately 26 $m^3/d$ for liquid into a phosphorus reactor (Vanotti et al., 2005c), and a phosphorus sludge generation rate of about 50 ml/liter treated in the phosphorus reactor (Vanotti et al., 2003). Control was raw swine manure without phosphorus sludge addition. This experiment was replicated three times. Samples of approximately 30 ml were taken at about 0, 0.5, 1, 2, 3, 18, and 24 hours from the mixing vessel and analyzed for soluble phosphorus and pH. Phosphorus sludge containing about 3143 mg total phosphorus per liter and <1 mg soluble phosphorus per liter was added to raw swine manure at a rate of about 33 ml/L. Results showed that soluble phosphorus concentrations in the raw swine manure mixture were significantly decreased by about half relative to swine manure (Table 2 below). This decrease occurred instantly once the phosphorus sludge was in contact with the raw swine manure (time=~0 h) and it was maintained throughout the approximately 24 hour stirring period (Table 2).

Liquid swine manure has a high buffer capacity (Fordham and Schwertmann, 1977; Sommer and Husted, 1995) that makes it difficult to increase its pH with alkali additions (Vanotti et al., 2003). Results obtained in the 24 hour mixing (Table 2) showed that the pH of the mixture was not significantly increased (p>0.05) with the addition of alkaline phosphorus sludge compared to a control without phosphorus sludge addition (Table 2). Although the pH increased approximately 0.9 units after the 24 hour stirring period, this increase was similar for both treatments, with and without phosphorus sludge addition. The increase in pH may have been related to aeration of the raw swine manure caused by continuous stirring. Experiments on aeration of anaerobic raw swine manure (Vanotti and Hunt, Trans. ASAE, Volume 43 (2), 405-413, 2000; Zhu et al., J. Environ. Sci. & Health (Part B), Volume 36 (2), 209-218, 2001) have shown similar pH increase of about 1 unit during the first day of aeration treatment.

TABLE 2

Evaluation of re-dissolution of phosphorus precipitate in the homogenization vessel by measuring changes in soluble phosphorus and pH after its addition and mixing with liquid swine manure.

| Time[a] (h) | Mixed Liquor pH | | Mixed Liquor Soluble Phosphorus (mg/L) | |
|---|---|---|---|---|
| | Without PS | With PS[b] | Without PS | With PS |
| 0 | 7.6 (0.02)[c] | 7.7 (0.02) | 65.9 (4.1) | 33.8 (4.6) |
| 0.5 | 7.7 (0.05) | 7.8 (0.04) | 65.2 (1.0) | 36.8 (2.7) |
| 1 | 7.7 (0.01) | 7.8 (0.02) | 63.3 (3.9) | 36.3 (1.1) |
| 2 | 7.8 (0.01) | 7.9 (0.01) | 62.1 (7.5) | 38.4 (3.8) |
| 3 | 7.9 (0.01) | 7.9 (0.01) | 65.7 (1.7) | 42.7 (3.8) |
| 18 | 8.4 (0.01) | 8.4 (0.01) | 53.1 (1.4) | 32.4 (0.9) |
| 24 | 8.4 (0.02) | 8.4 (0.03) | 50.8 (0.7) | 28.9 (0.8) |

[a]This experiment evaluates changes in soluble phosphorus and pH in the mixture of flushed raw swine manure (SM) and precipitated phosphorus sludge (PS) during mixing in the homogenization vessel (FIG. 2) without any addition of PAM. A control consisting of SM without PS addition is also included;.
[b]PS was added at a rate of approximately 33 mL per L of SM. Characteristics of SM before mixing were: pH = 7.53, TP = 342 mg/L, soluble P = 66 mg/L. Characteristics of precipitated phosphorus sludge were: pH = 10.24, TP = 3143 mg/L, soluble P = 0.8 mg/L.
[c]Data are mean and standard deviation of three replicates.

For the successful implementation of the process of simultaneous solid-liquid separation of phosphorus sludge and swine manure, the calcium phosphate precipitate generated at pH>10.5 does not redissolve when phosphorus sludge is mixed with swine manure of pH≈7.5 in the homogenization vessel (FIG. 2). This is important because subsequent PAM application in this process is to agglomerate suspended solid particles in the mixed liquor. PAM is not effective for removal of soluble P contained in liquid swine manure (Vanotti and Hunt, 1999). The phosphorus sludge non-redissolution was confirmed by assessing levels of soluble P in the swine manure/phosphorus sludge mixture during a 24-hour mixing period and comparing results with those of a control consisting of stirred swine manure without phosphorus sludge addition (Table 2 above). In this example, phosphorus sludge containing 3143 mg TP/liter and <1 mg soluble P was added to swine manure at a rate of approximately 33 ml/L. In a situation of complete redissolution, this phosphorus sludge addition would have increased soluble P concentrations in the swine manure/phosphorus sludge mixture by approximately 104 mg/l. Instead, results showed that soluble P concentrations in the swine manure/phosphorus sludge mixture were significantly decreased by about half relative to swine manure (Table 2 above). This decrease occurred instantly once the phosphorus sludge was in contact with the swine manure (time=0 hours) and it was maintained throughout the 24 hour stirring period (Table 2). Two conclusions are derived from this finding: (1) calcium phosphate precipitate generated with the soluble P removal process (Vanotti et al., 2003 and 2005b) does not redissolve when mixed with swine manure; therefore, it is amenable for simultaneous separation with flocculants; and (2) its addition to raw swine manure removes additional soluble P from the liquid phase.

For the successful implementation of simultaneous solid-liquid separation of swine manure and phosphorus sludge, the alkaline phosphorus sludge addition cannot result in a significant pH increase in the mixed liquor. A high pH (>9) promotes conversion of $NH_4^+$ into $NH_3$ and gaseous N emissions, which are contrary to the function of the total system. Liquid swine manure has a high buffer capacity (Fordham and Schwertmann, 1977; Sommer and Husted, 1995), that makes it difficult to increase its pH with alkali additions (Vanotti et al., 2003). Results obtained in the 24 hour mixing experiment (Table 2) showed that pH of the mixed liquor was not significantly increased (p>0.05) with the addition of alkaline phosphorus sludge compared to a control without phosphorus sludge addition (Table 2). Although pH increased approximately 0.9 units after, the 24 hour stirring period, this increase was similar for both treatments (with or without phosphorus sludge addition). Thus, it was unrelated to the phosphorus sludge addition. It was probably related to aeration of the swine manure caused by continuous stirring because experiments on aeration of anaerobic swine manure (Vanotti and Hunt, 200; Zhu et al., 2001) have shown similar pH increases of about 1 unit during the first day of aeration treatment.

EXAMPLE 3

This example compared the performance of cationic (+), neutral (0), and anionic (−) PAMs for solid-liquid separation of swine manure/phosphorus sludge mixtures. The polymers employed were commercially available PAM formulations (Table 3). For cationic PAM, two types were evaluated: one with approximately 20% charge density and another with approximately 75% charge density. The PAM treatments were applied to the raw swine manure/phosphorus sludge mixture (approximately 33 ml of phosphorus sludge per liter of swine manure) using working solutions at a rate of approximately 60 mg active ingredient (a.i.) per liter. Working solutions of PAM were approximately 0.2% secondary solutions after preparation of approximately 0.5% primary stocks (WERF, 1993). The swine manure/phosphorus sludge and PAM were mixed for approximately 30 seconds and poured into a 0.25 mm screen to separate the mixture into its solid and liquid (filtrate) components. Treatment performance was determined by the difference between total suspended solids, Chemical Oxygen Demand (COD), and total phosphorus concentrations in the filtrate and those of the initial swine manure/phosphorus sludge mixture before PAM application and screening. This was replicated twice and included a control treatment without polymer addition.

The effect of PAM charge type and density on totals suspended solids, Chemical Oxygen Demand, and total phosphorus separation from a mixture of raw swine manure and phosphorus sludge is shown in Table 4. The raw swine manure/phosphorus sludge mixture (approximately 33 ml per L of raw swine manure) was treated with various PAMs (See. Table 3) having different charge types (anionic, neutral, and cationic) and density (within the cationic group) using a uniform rate of approximately 60 mg/L. Data presented in Table 4 show characteristics of the treated liquid after screening (approximately 0.25 mm opening size) and include a control treatment without PAM addition (screening only). Without PAM addition, the effluent was turbid (approximately 4030 mg total suspended solids per L) resulting in low (<38%) separation efficiencies for total suspended solids, COD, and total phosphorus with respect to the initial raw swine manure/phosphorus sludge mixture. Polymer type was very important on the overall effectiveness of the simultaneous solid-liquid separation process evaluated. Both anionic and highly-charged cationic PAMs (PAM-A and PAM-HC, Table 4) were not useful for this application; PAM-A showed an overall poor performance not different than the control, and PAM-HC was effective to capture manure solids (about 88%) but interacted negatively with the phosphorus sludge that resulted in a low total phosphorus removal efficiency (about 12%), which was worse than the control. In contrast, neutral and moderately charged cationic PAMs (PAM-N and PAM-C, Table 4) showed a superior performance that was consistent among water quality indicators evaluated, with PAM-C having the highest and most desirable removal efficiencies for total suspended solids (approximately 96%), COD (approximately 75%), and total phosphorus (approximately 83%). Therefore, cationic PAM with approximately 20 mole % charge density (PAM-C) was selected for use in subsequent experiments. The reaction of PAM-C and raw swine manure/phosphorus sludge mixture was instantaneous and produced large, dark brown flocs with the white calcium phosphate particles enmeshed within the flocs. In turn, the flocs containing both raw swine manure and phosphorus sludge solids were readily separated with the screen, leaving a remarkedly clear (total suspended solids=approximately 240 mg/L) liquid effluent (Table 4).

TABLE 3

Characteristics of polyacrylamides (PAM).

| Chemical Treatment | Polymer Name[a] | Charge Type | Charge Density Mole % | Active Polymer % | Physical Form |
|---|---|---|---|---|---|
| PAM-N | Magnifloc 985N | Neutral | 0 | 85 | Powder |
| PAM-A | Magnafloc 120L | Anionic | 34 | 50 | Liquid |
| PAM-C | Magnifloc 494-C | Cationic | 20 | 85 | Powder |
| PAM-HC | Excel Ultra 5000 | Cationic | 75 | 27 | Liquid |

[a]Commerical formulations: 985N, 494C and Excel Ultra 5000 were suppled by Cytec Industries Inc., West Patterson, N.J.; Magnafloc 120L was supplied by Ciba Specialty Chemicals Water treatment, Inc., Suffolk, VA.

TABLE 4

Effect of polyacrylamide (PAM) charge type on separation of total suspended solids (TSS) COD, and total phosphorus (TP) forma mixture of flushed raw swine manure and precipitated phosphorus sludge flocculation and screening.[a]

| | TSS | | COD Effluent | | TP Effluent | |
|---|---|---|---|---|---|---|
| Chemical Treatment[b] | Effluent Conc. g/L | Removal Efficiency[c] % | Conc. g/L | Removal Efficiency | Conc. mg/L | Removal Efficiency % |
| Control | 4.03 (1.79)[d] | 38.0 | 6.01 (1.59) | 27.4 | 244 (73) | 36.6 |
| PAM-N | 1.32 (0.14) | 79.7 | 2.61 (0.38) | 68.5 | 74 (0.4) | 80.7 |

TABLE 4-continued

Effect of polyacrylamide (PAM) charge type on separation of total suspended solids (TSS) COD, and total phosphorus (TP) form a mixture of flushed raw swine manure and precipitated phosphorus sludge flocculation and screening.[a]

| Chemical Treatment[b] | TSS | | COD Effluent | | TP Effluent | |
|---|---|---|---|---|---|---|
| | Effluent Conc. g/L | Removal Efficiency[c] % | Conc. g/L | Removal Efficiency | Conc. mg/L | Removal Efficiency % |
| PAM-A | 3.71 (1.43) | 42.9 | 5.82 (1.53) | 29.7 | 218 (74) | 43.2 |
| PAM-C | 0.24 (0.02) | 96.3 | 2.09 (0.04) | 74.8 | 65 (5) | 83.1 |
| PAM-HC | 0.77 (0.33) | 88.2 | 2.86 (0.11) | 65.5 | 337 (11) | 12.1 |

[a]Experimental configuration is shown in FIG. 2. The mixture of flushed raw swine manure (SM) and precipitated phosphorus sludge (PS) was treated with various PAMs with different charge types. Data show characteristics of the treated liquid after screening.
[b]PAM rate = approximately 60 mg active polymer/L; N = neutral, A = anionic, C = cationic with 20% charge density, HC = cationic with 75% charge density (Table 3). Control = screened effluent without PAM addition.
[c]Removal efficiency relative to concentrations in the mixture of SM and PS (Homogenization, FIG. 2). Mixture contained approximately 6.50 g total suspended solids per liter, 8.28 g COD per liter, and 384 mg total phosphorus per liter; Phosphorus sludge contributed approximately 16%, 4%, and 22% of the total suspended solids, COD, and total phosphorus in the mixture, respectively.
[c]Data are the mean and standard deviation of two replicates.

For successful implementation of the process of simultaneous solid-liquid separation of swine manure and phosphorus sludge, at least one PAM treatment is applied which can simultaneously affect both solids in the mixture. The effect of PAM charge type and density on total suspended solids, chemical oxygen demand, and total phosphorus separation from a mixture of swine manure and phosphorus sludge is shown in Table 4. The swine manure/phosphorus sludge mixture at approximately 33 ml phosphorus sludge per liter of swine manure was treated with various PAMs (Table 3) having different charge types (anionic, neutral, cationic) and density (within the cationic group) using a uniform rate of approximately 60 mg/L. Data presented in Table 4 show characteristics of the treated liquid after screening (approximately 0.25-mm opening size) and include a control treatment without PAM addition (screening only). Without PAM addition, the effluent was turbid (approximately 4030 mg TSS/L) resulting in low (<38%) separation efficiencies for total suspended solids, chemical oxygen demand, and total phosphorus with respect to the initial swine manure/phosphorus sludge mixture. Polymer type was very important on the overall effectiveness of the simultaneous solid-liquid separation process evaluated. Both anionic and highly-charged cationic PAMs (PAM-A and PAM-C, Table 4) were not useful for this application; PAM-A showed an overall poor performance not different than the control, and PAM-HC was effective to capture manure solids (approximately 88%) but interacted negatively with the phosphorus sludge that resulted in a low total phosphorus removal efficiency (approximately 12%), which was worse than the control. In contrast, neutral and moderately-charged cationic PAMs (PAM-N and PAM-C, Table 4) showed superior performance that was consistent among water quality indicators evaluated, with PAM-C having the highest and most desirable removal efficiencies for total suspended solids (approximately 96%), chemical oxygen demand (approximately 75%) and total phosphorus (approximately 83%). Therefore, cationic PAM with approximately 20% mole % charge density (PAM-C) was selected for use. The reaction of PAM-C and swine manure/phosphorus sludge mixture was instantaneous and produced large, dark brown flocs with white calcium phosphate particles enmeshed within the flocs. In turn, the flocs containing both swine manure and phosphorus sludge solids were readily separated with the screen, leaving a remarkably clear (total suspended solids=240 mg/L) liquid effluent (Table 4).

EXAMPLE 4

Pretreatment of phosphorus sludge with anionic PAM was evaluated to see if it enhances the subsequent solid-liquid separation of the raw swine manure/phosphorus sludge mixture using cationic PAM. Phosphorus sludge was pretreated with approximately 0, 15, 30 and 60 mg a.i./L of anionic PAM (Magnafloc 120L, Table 2) in separate glass vessels before its addition to the raw swine manure. The pretreated phosphorus sludge was mixed with the swine manure in the homogenization vessel. Subsequently, the swine manure/phosphorus sludge mixture was treated with approximately 60 mg/L cationic PAM (Magnifloc 494C; Table 2) and passed through a screen as previously described above in Example 3. Treatment effectiveness was determined by assessing the quality of the filtrate for total suspended solids, chemical oxygen demand, soluble phosphorus, total Kjeldahl nitrogen, and $NH_4$—N compared to initial concentrations. Control was a single polymer application of 0 mg/L of PAM-A and approximately 60 mg/L of PAM-C (Table 5). The experiment was replicated two times.

Pretreatment of phosphorus sludge with approximately 15-30 mg/L of anionic PAM did not improve the efficiency of cationic PAM compared to control and that higher amounts of anionic PAM, approximately 60 mg/L, deteriorated the quality of the effluent (Table 5). The single polymer application (control) removed approximately 96% of the total suspended solids, approximately 68% of the chemical oxygen demand, approximately 83% of the total phosphorus, and approximately 35% of the total Kjeldahl nitrogen from the swine manure/phosphorus sludge mixture.

In the system of the '567 patent (supra), (FIG. 1a), anionic PAM was used to flocculate the phosphorus sludge to effectively separate the calcium phosphate precipitate using specialized filtration dewatering equipment. In the system of the present invention, anionic PAM is not required because the cationic PAM optimized the separation of solids from the swine manure/phosphorus sludge mixture.

obtained without PAM treatment, approximately 2.75 to 3.16 mg/L total suspended solids, or to initial levels in homogenization vessels of approximately 3.93 to 4.40 mg/L total suspended solids. At equal PAM application rates, however, removal efficiencies for total phosphorous were higher for the swine manure/phosphorus sludge mixture as compared to swine manure alone, approximately 78-80% vs. approximately 60-64%, respectively. The higher total phosphorus removal efficiency in the swine manure/phosphorus mixture

TABLE 5

Removal of solids, chemical oxygen demand, phosphorus, and nitrogen from a mixture of flushed raw swine manure and precipitated phosphorus sludge by PAM flocculation and screening.[a]

| Anionic PAM Applied to PS[b] mg/L | Cationic PAM Rate[c] mg/L | Water Quality Characteristics of Treated Liquid ||||||
|---|---|---|---|---|---|---|---|
| | | Total Suspended Solids g/L | Chemical Oxygen Demand g/L | Total Phosphorus mg/L | Soluble Phosphorus Mg/L | TKN Mg/L | $NH_4$—N Mg/L |
| 0 | 60 | 0.23 (0.06)[d] | 2.66 (0.96) | 66.4 (8.8) | 32.4 (0.2) | 542 (11) | 431 (4) |
| 15 | 60 | 0.31 (0.07) | 2.30 (0.08) | 66.6 (2.6) | 32.3 (5.5) | 544 (19) | 446 (0.6) |
| 30 | 60 | 0.32 (0.12) | 1.98 (0.48) | 66.6 (6.0) | 33.9 (0.6) | 543 (12) | 450 (12) |
| 60 | 60 | 0.44 (0.08) | 2.45 (0.53) | 78.8 (10.6) | 40.7 (2.7) | 582 (27) | 462 (2) |

[a]Experimental configuration shown in FIG. 2.
[b]Rates are mg active polymer/L of Phosphorus sludge
[c]Rates are mg active polymer/L of swine manure/phosphorus sludge mixture.
[d]Data are the mean and (standard deviation) of two replicates. The initial mixture contained 6.50 g/L Total suspended solids, 8.28 g/L chemical oxygen demand, 383.5 mg/L total phosphorus, 54.6 mg/L soluble phosphorus, 840 mg/L total Kjeldahl nitrogen, and 445 mg/L $NH_4$—N. Phosphorus sludge contributed 16% total suspended solids, 4% chemical oxygen demand, 22% total phosphorus,, 0.1% soluble phosphorus, 1% total Kjeldahl nitrogen, and 0.1% $NH_4$—N into the mixture.

EXAMPLE 5

The rate of PAM application to the mixture of swine manure/phosphorus sludge mixture was compared to the optimum rate needed to treat swine manure alone without the addition of phosphorus sludge. Swine manure was added to ten glass reaction vessels but only half received phosphorus sludge treatment of approximately 33 mg/L (3.3%/L). Five PAM rates of approximately 0, 30, 60, 90, and 120 mg/L were then applied to each group. Cationic PAM with an approximately 20% charge density was used (Magnifloc 494C, Table 3). Polymer application and subsequent screening were performed as previously described in Example 3. Flocculation and filtration performance were determined by assessing the quality of the liquid filtrate that included total suspended solids, chemical oxygen demand, total phosphorus, and soluble phosphorus determinations. This study was performed on three different swine manure field samples of various strengths and it was replicated two times.

Results show that the addition of phosphorus sludge to the raw swine manure did not increase the amount of the PAM that would normally be used to effectively treat swine manure (See Table 6). PAM application rates of approximately ≧60 mg/L to either swine manure/phosphorus sludge or swine manure alone produced consistently high separation efficiencies for total suspended solids and chemical oxygen demand (>90% and >70%, respectively Table 6). In both cases, the screened effluent after PAM application was clarified and contained relatively low total suspended solids, approximately 0.21 to 0.38 mg/L, compared to the turbid effluent was due in part to higher amounts of particulate phosphorus present (particulate phosphorus=total phosphorus–soluble phosphorus) that is amenable for solid-liquid separation, approximately 212 vs. 145 mg/L, and in part because of additional capture of soluble phosphorus of about 30% by the added phosphorus sludge, a fraction that is typically not separated with PAM treatment alone (Table 6).

Flocs produced from the application of PAM to the swine manure/phosphorus sludge mixture separated from the screen more easily because they were not as sticky as the flocs produced when PAM was applied to swine manure alone. This self-cleaning action represents a significant advantage of the simultaneous separation process because solid-liquid separation of manure using PAM and screening requires frequent washing of the screen surface in order to keep it unclogged and functional.

Figure 3:
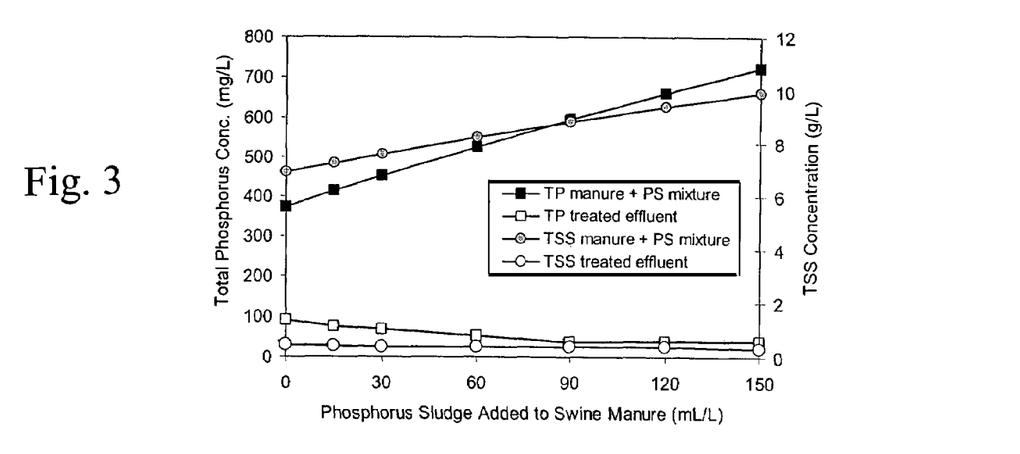

Data in Table 7 and FIG. 3 show that water quality of the treated liquid was actually improved when increased amounts of phosphorus sludge were added to the swine manure of up to approximately 15% or approximately 150 ml/L evaluated. The same doage of PAM, approximately 60 mg/L, was effective to separate solids from all six swine manure/phosphorus sludge mixtures even when phosphorus sludge addition increased toal suspended solids concentration by about 43%, from approximately 6.93 to approximately 9.93 g/L, FIG. 3; and total phosphorus concentration by about 94%-, from approximately 373 to approximately 724 mg/L, FIG. 3. Removal efficiencies obtained at the higher phosphorus sludge rate of approximately 150 ml/L were about 96.8% for total suspended solids, about 94.7% for total phosphorus, about 85.4% for chemical oxygen demand, about 61.5% for soluble phosphorus, about 39.5% for total Kjedhal nitrogen, and about 64.8% for alkalinity.

kjeldahl nitrogen) of the solids separated by the screen was determined using the acid block digestion procedure of Gallaher et al. (Gallaher, R. N., C. O. Weldon, and F. C. Boswell.

TABLE 6

Removal of total suspended solids (TSS), chemical oxygen demand (COD), total phosphorus (TP), and soluble phosphorus from flushed swine manure or a mixture of swine manure and precipitated phosphorus sludge by PAM flocculation and screening.[a]

| Cationic PAM Rate mg/L | Effluent Conc. g/L | TSS Removal Efficiency[b] % | Effluent Conc. g/L | COD Removal Efficiency % | Effluent Conc. g/L | TP Removal Efficiency % | Effluent Conc. g/L | Soluble Phosphorus Removal Effiency % |
|---|---|---|---|---|---|---|---|---|
| Treatment of Flushed Swine Manure w\o Phosphorus Sludge addition | | | | | | | | |
| 0   | 2.75 (1.91)[c] | 30.0 | 5.02 (3.10) | 27.6 | 189 (142) | 13.8 | 75.8 (7.4)  | 0    |
| 30  | 0.51 (0.02)    | 87.0 | 2.53 (0.62) | 63.5 | 152 (127) | 30.6 | 72.9 (11.5) | 1.7  |
| 60  | 0.37 (0.07)    | 90.6 | 1.94 (0.84) | 72.0 | 87 (12)   | 60.5 | 76.4 (8.9)  | 0    |
| 90  | 0.31 (0.16)    | 92.1 | 1.68 (0.71) | 75.8 | 80 (14)   | 63.3 | 76.7 (14.8) | 0    |
| 120 | 0.21 (0.09)    | 94.7 | 1.46 (0.53) | 78.9 | 79 (16)   | 64.2 | 76.5 (14.2) | 0    |
| Treatment of a Mixture of Flushed Swine Manure ad Phosphorus Sludge | | | | | | | | |
| 0   | 3.16 (2.04)    | 32.8 | 5.38 (2.72) | 22.1 | 222 (132) | 21.9 | 45.1 (10.9) | 37.1 |
| 30  | 0.54 (0.08)    | 88.5 | 2.09 (0.55) | 69.8 | 128 (108) | 55.0 | 50.8 (6.2)  | 39.2 |
| 60  | 0.38 (0.07)    | 91.9 | 1.63 (0.61) | 76.4 | 62 (14)   | 78.4 | 51.0 (6.6)  | 28.9 |
| 90  | 0.23 (0.09)    | 95.1 | 1.43 (0.63) | 79.3 | 59 (10)   | 79.3 | 52.3 (8.9)  | 27.1 |
| 120 | 0.24 (0.10)    | 94.4 | 1.40 (0.58) | 79.7 | 56 (14)   | 80.3 | 52.4 (9.5)  | 27.0 |

[a]Configuration shown in FIG. 2. Data show characteristics of the treated liquid after screening.
[b]Removal efficiency relative to concentrations in the homogenization vessel before PAM treatment. Concentrations in Swine manure were: TSS = 3.93 g/L, COD = 6.93 g/L, TP = 219 mg/L, soluble Phosphorus = 74.1 mg/L. Concentrations in phosphorus sludge were: TSS = 27.9 g/L, COD = 6.10 g/L, TP = 2254 mg/L, soluble phosphorus = 0.1 mg/L. Phosphorus sludge was added at a rate of 33 mL/L that results in a mixture with approximately 4.40 g/L TSS, 6.91 g/L COD, 284 mg/L TP, and 71.8 mg/L soluble phosphorus.
[c]Data are the mean and (standard deviation) of two replicates performed on three field samples (n = 6).

EXAMPLE 6

The overall PAM separation process performance with respect to water quality and recovery of phosphorus was evaluated when various amounts of phosphorus sludge were added to the swine manure. Phosphorus recovery in the solids was determined using mass balances that considered solids weight and phosphorus concentration. Data were statistically analyzed by means and standard deviations (proc MEANS), analyses of variance (proc ANOVA), and least significant difference (LSD) test at the 5% level for significant differences among treatment means (SAS Institute, 1988). Linear regression analysis was used to describe phosphorus recovery in solids as relates to phosphorus added to swine manure with the phosphorus sludge.

Seven phosphorus sludge rate treatments were used in order to assess phosphorus recovery after simultaneous flocculation with flushed swine manure using PAM. Phosphorus content was determined in the separated solids obtained in the process. Phosphorus sludge treatment rates were approximately 0, 15, 30, 60, 90, 120 and 150 ml/L of swine manure. The PAM used was cationic with approximately a 20% charge density (Magnifloc 494C, Table 3). It was applied at the same rate of approximately 60 mg/L to every swine manure/phosphorus sludge mixture treatment combination. Polymer application and screening were performed as previously described for Example 3. In addition to the water quality of the filtrate (total suspended solids, chemical oxygen demand, total Kjeldahl nitrogen, alkalinity, and pH), the dry weight and chemical composition (total phosphorus and total kjeldahl nitrogen) of the solids separated by the screen was determined using the acid block digestion procedure of Gallaher et al. (Gallaher, R. N., C. O. Weldon, and F. C. Boswell. 1976. A semiautomated procedure for total nitrogen in plant and soil samples. *Soil Sci. Soc. Am. J.* 40:887-889). Total phosphorus and total kjeldahl nitrogen were determined using the ascorbic acid method and the phenate method, respectively, adapted to digested extracts (Technicon Instruments Corp., 1977). Alkalinity was determined by acid titration to the bromocresol green enpoint (pH approximately 4.5) and expressed as m $CaCO_3$/L. Dry weight of the separated solids was determined by the difference between the weight of the filter and the weight of the filter+solids dried at approximately 45° C. for about 24 hours in a forced-air chamber. The same phosphorus sludge treatments were applied to three different field samples and replicated two times. A control treatment consisting of screened swine manure without phosphorus sludge or PAM addition was also included as a reference point.

Figure 4:
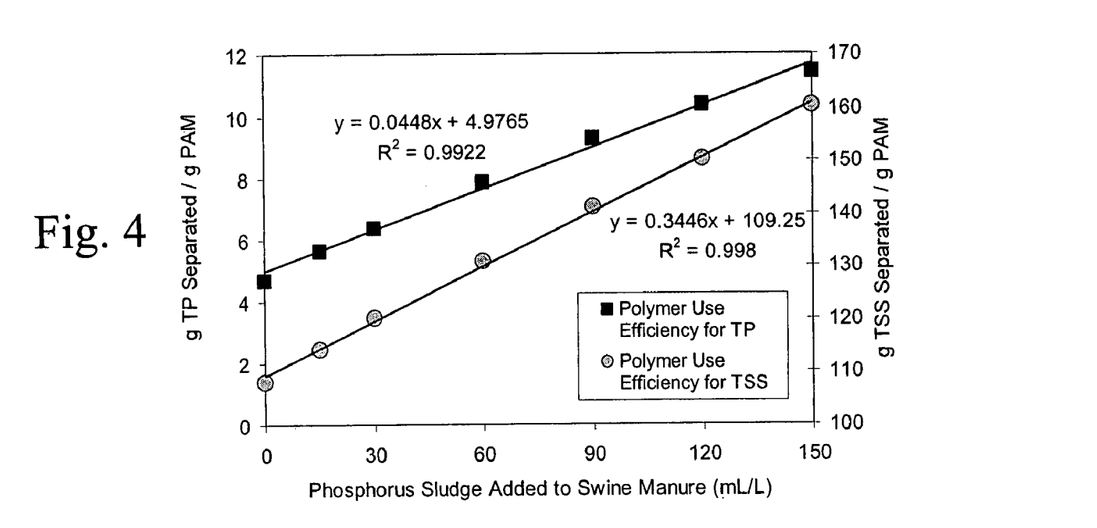

Data in Table 7 and FIG. 3, show that water quality of the treated liquid was actually improved when increased amounts of phosphorus sludge were added to swine manure of up to approximately 15% or approximately 150 ml/L evaluated. The same dosage of PAM, approximately 60 mg/L, was effective to separate solids from all six swine manure/phosphorus sludge mixtures even when phosphorus sludge addition increased total suspended solids concentration by about 43% (from about 6.93 to about 9.93 g/L, FIG. 4) and total phosphorus concentration by about 94% (from about 37.3 to about 723 mg/L, FIG. 3). Removal efficiencies obtained at the higher phosphorus sludge rate of approximately 150 ml/L, were approximately 96.8%, for total suspended solids, approximately 94.7% for total phosphorus, approximately 85.4% for chemical oxygen demand, approximately 61.5% for soluble phosphorus, approximately 39.5% for total kjeldahl nitrogen, and approximately 64.8% for alkalinity. The corresponding PAM use efficiencies for total suspended solids (g TSS removed/g PAM) increased linearly from approximately 108 to approximately 160 grams total suspended solids separated/g PAM, with increased amount of phosphorus sludge added to swine manure in the range of approximately 0 to approximately 150 ml/L (FIG. 4). Polymer use efficiencies were also calculated in terms of total phosphate: grams total phosphate separated/g PAM. These efficiencies also increased linearly with the phosphorus sludge addition, from approximately 4.7 to approximately 11.4 g total phosphorus/g PAM (FIG. 4). These results indicate that the simultaneous separation process is much more efficient in terms of polymer consumption compared with a situation where two dewatering units are used to separate the same amounts of solids.

The pH and alkalinity are important considerations for optimum biological nitrogen treatment; if the wastewater contains insufficient alkalinity, the growth of autothrophic biomass will cease because the inorganic carbon needed by the microorganism is missing, and because of the acid pH (Grady et al., 1999; Vanotti and Hunt, 2000). The pH and alkalinity characteristics of the liquid after simultaneous separation process were within the values considered optimum for biological nitrogen treatment of liquid swine manure. The pH increased slightly from about 7.9 to about 8.1 after addition of approximately 150 ml/L of alkaline phosphorus sludge that illustrates the high buffer capacity of the swine manure (See Table 7). The effluent pH obtained from the various swine manure/phosphorus sludge mixtures were within a reported pH range of about 7.7 to about 8.5 that optimize nitrification treatment of swine manure (Vanotti and Hunt, 2000). The alkalinity concentration in the treated liquid was sufficient for complete biological nitrogen removal treatment using nitrification/denitrification configuration shown in FIG. 2. For example, the alkalinity concentration of approximately 2.66 g/L obtained at the higher phosphorus sludge rate (Table 7) was higher than a minimum alkalinity requirement of approximately 1.98 g/L needed for nitrification/denitrification of liquid containing approximately 554 mg nitrogen/L (Table 7), considering an alkalinity consumption of approximately 3.57 mg-$CaCO_3$ per mg Nitrogen converted to $N_2$, i.e. release of approximately 2 moles of $H^+$ per mole of $NH_4^+$ oxidized and consumption of approximately 1 mole of $H^+$ per mole of $NO_3^-$ reduced (Tchobanoglous and Burton, 1991).

Figure 5:
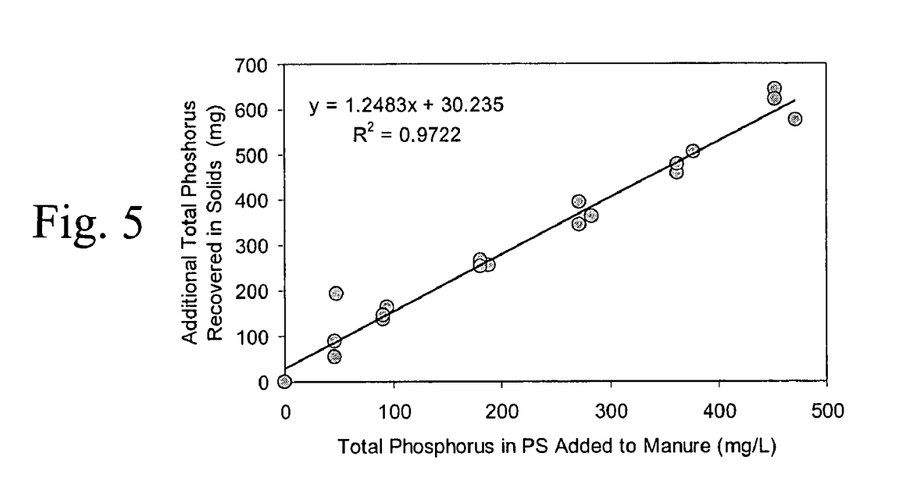

More than about 90% of the total phosphorus removed from the swine manure/phosphorus sludge mixture was recovered in the separated solids as shown in Table 8. There calculations include the original phosphorous in manure, approximately 373 mg/L, and phosphorus added with the phosphorus sludge, up to approximately 458.6 mg/L. When the incremental phosphorus recovery in the solids above that originally contained in the manure is considered, the simultaneous separation process produced a quantitative recovery of the phosphorus in the phosphorus sludge that was added to the swine manure (FIG. 5). As a consequence, phosphorus content of the separated solids significantly increased, from approximately 9.5% to approximately 16.9% $P_2O_5$, corresponding to increased amounts of phosphorus sludge added to the manure (Table 8). This higher phosphorus content in the separated solids makes the material more desirable from the point of view of its fertilizer value. For example, higher phosphorus content makes more economical its transport when used fresh or composted for crop utilization. The enriched phosphorus material makes ashes more valuable when material is used for energy production through gasification.

TABLE 7

Water quality characteristics of the treated liquid using simultaneous separation of solids from liquid swine manure and precipitated phosphorus sludge[a].

| Phosphorus sludge Added to Swine Manure ml/L | % (v/v) | TSS g/L | COD g/L | Total Phosphorus mg/L | Soluble Phosphorus mg/L | Total Kjedahl Nitrogen mg/L | Alkalinity g/L | pH |
|---|---|---|---|---|---|---|---|---|
| \multicolumn{9}{c}{No PAM Applied. Screening Only Used} |
| 0 | 0 | 4.84 (1.17)[b] | 7.33 (2.32) | 266 (58.8) | 74.8 (6.5) | 1,001 (200) | 4.43 (0.11) | 7.82 (0.15) |
| \multicolumn{9}{c}{Approximately 60 mg/L of cationic PAM applied to mixture[c]} |
| 0 | 0 | 0.45 (0.24) | 2.09 (0.83) | 91.7 (14.3) | 69.4 (3.7) | 638 (162) | 3.20 (0.60) | 7.85 (0.15) |
| 15 | 1.5 | 0.42 (0.21) | 2.08 (1.16) | 74.1 (24.9) | 55.3 (2.7) | 621 (184) | 2.93 (0.43) | 7.90 (0.21) |
| 30 | 3 | 0.39 (0.24) | 1.94 (0.85) | 68.4 (14.4) | 47.1 (3.4) | 623 (162) | 2.89 (0.50) | 7.92 (0.18) |
| 60 | 6 | 0.38 (0.13) | 1.16 (0.06) | 54.2 (4.1) | 33.8 (5.4) | 608 (118) | 2.97 (0.48) | 7.97 (0.17) |
| 90 | 9 | 0.36 (0.08) | 1.09 (0.09) | 36.8 (10.9) | 25.0 (5.9) | 546 (183) | 2.78 (0.36) | 8.00 (0.18) |
| 120 | 12 | 0.39 (0.03) | 1.36 (0.47) | 37.6 (6.1) | 17.7 (7.4) | 544 (148) | 2.63 (0.55) | 8.07 (0.16) |
| 150 | 15 | 0.32 (0.08) | 1.33 (0.56) | 38.3 (10.8) | 15.2 (5.9) | 554 (110) | 2.66 (0.49) | 8.11 (0.14) |

[a]Experimental configuration shown in FIG. 2.
[b]Data are mean (and standard deviation) of two replicate tests performed on three field samples (n = 6). Characteristics of the raw swine manure were: Total Suspended Solids = approximately 6.91 g/L, chemical oxygen demand = approximately 9.11 g/L, total phosphorus = approximately 367 mg/L, soluble phosphorus = approximately 71.8 mg/L, total kjedahl nitrogen = approximately 1030 mg/L, alkalinity = approximately 4.42 g/L, pH = approximately 7.43. Characteristics of phosphorus sludge were: Total Suspended Solids = approximately 29.9 g/L, chemical oxygen demand = approximately 6.37 g/L, total phosphorus = approximately 3058 mg/L, soluble phosphorus = approximately 0.3 mg/L, total kjedahl nitrogen = approximately 200 mg/L, alkalinity = approximately 8.10 g/L, pH = approximately 10.1.
[c]Cationic PAM = Magnifloc 494C (Table 3).

TABLE 8

Phosphorus content and recovery in solids produced from mixtures of liquid swine manure and phosphorus sludge using a simultaneous separation process.[a]

| Phosphorus Sludge Added to Swine Manure ml/L | Phosphorus Sludge Added to Swine Manure % (v/v) | Total Phosphorus Added to Swine Manure mg/L | Total Phosphorus in Homogenization Vessel (1) (mg) | Total Phosphorus in Separated Solids (2) (mg) | Total Phosphorus Recovery [(2/1) × 100] (%) | Phosphorus Content of Solids (% $P_2O_5$) |
|---|---|---|---|---|---|---|
| 0 | 0 | 0 | 373.0 (96.1)[b] | 268.8 (81.5) | 71.7 (9.5) | 9.5 (0.5) |
| 15 | 1.5 | 45.8 (1.2) | 418.9 (96.9) | 381.5 (112.6) | 90.2 (7.2) | 11.4 (1.6) |
| 30 | 3 | 91.8 (2.2) | 464.7 (97.6) | 417.1 (81.7) | 90.0 (5.4) | 12.4 (1.4) |
| 60 | 6 | 183.4 (4.4) | 556.5 (99.2) | 525.9 (87.1) | 94.9 (8.2) | 13.7 (1.4) |
| 90 | 9 | 275.2 (6.6) | 648.2 (100.8) | 635.1 (56.2) | 98.8 (8.3) | 14.9 (2.1) |
| 120 | 12 | 367.0 (8.8) | 740.0 (10.5) | 748.1 (81.2) | 101.4 (4.1) | 15.8 (1.6) |
| 150 | 15 | 458.6 (11.0) | 831.7 (104.1) | 881.5 (89.5) | 106.6 (10.5) | 16.9 (1.3) |

[a]Experimental configuration is shown in FIG. 2. The various mixtures of swine manure and phosphorus sludge were treated with approximately 60 mg/L of PAM and screened. Data shown phosphorus content in the separated solids. Water quality characteristics of treated effluent are shown in Table 7 and FIG. 3. Total phosphorus recoveries on top of the 0 ml/L treatment are shown in FIG. 5.
[b]Data are mean (and standard deviation) of two replicate tests performed on three field samples (n = 6). Total phosphorus are mass calculations based on 1 L of swine manure.

The foregoing detailed description is for the purpose of illustration. Such detail is solely for that purpose and those skilled in the art can make variations therein without departing from the spirit and scope of the invention.

We claim:

1. A system for treating wastewater comprising:
   a. a raw wastewater stream in fluid communication with a homogenization tank, a solid separation unit and a phosphorus separation reactor unit,
   b. said solid separation unit in fluid communication with said homogenization tank,
   c. a denitrification unit in direct fluid communication with a clarified effluent of said solid separation unit,
   d. a nitrification unit in fluid communication with said denitrification unit, and
   e. said phosphorus separation reactor unit in fluid communication with a liquid effluent from said nitrification unit and in fluid communication with said raw wastewater stream, wherein said system is a simultaneous operation producing one stream of solids.

2. The system of claim 1 further comprising a clarification unit in fluid communication with said nitrification unit and said phosphorus unit.

3. The system of claim 1 wherein a polymer flocculant is used in said solid separation unit to clump suspended solids in a manure/phosphorus sludge mixture.

4. The system of claim 3 wherein said polymer flocculant is selected from the group consisting of a cationic polyacrylamide, cationic polyethlyemimine, chitosan, polysaccharides, and mixtures thereof.

5. A process comprising:
   a. providing two fluid streams to form a mixture of a manure sludge and a phosphorus sludge,
   b. Treating said mixture with a polymer flocculant to separate solids in said mixture to form a single solid stream and an effluent stream,
   c. Treating said effluent stream to remove nitrogen by a denitrification process and a nitrification process to form a nitrified effluent stream,
   d. Treating said nitrified effluent stream to precipitate phosphorus to form a phosphorus precipitate sludge and a treated effluent,
   e. cycling said phosphorus precipitate sludge to a homogenization tank to form said mixture of a manure sludge and phosphorus precipitate sludge.

6. The process of claim 5 wherein said polymer flocculant is selected from the group consisting of a cationic polyacrylamide, cationic polyethlyemimine, chitosan, polysaccharides, and mixtures thereof.

* * * * *